(12) United States Patent
Burns

(10) Patent No.: US 9,883,031 B2
(45) Date of Patent: *Jan. 30, 2018

(54) ADAPTIVE COMMUNICATION HANDLING

(71) Applicant: SHORETEL, INC., Sunnyvale, CA (US)

(72) Inventor: Robert R. Burns, Campbell, CA (US)

(73) Assignee: Shoretel, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/496,148

(22) Filed: Apr. 25, 2017

(65) Prior Publication Data
US 2017/0230501 A1 Aug. 10, 2017

Related U.S. Application Data

(63) Continuation of application No. 14/553,407, filed on Nov. 25, 2014, now Pat. No. 9,661,135.

(51) Int. Cl.
H04M 3/42 (2006.01)
H04W 4/16 (2009.01)
H04M 1/725 (2006.01)
H04M 3/58 (2006.01)
H04M 3/02 (2006.01)
H04M 3/54 (2006.01)
H04W 68/00 (2009.01)

(52) U.S. Cl.
CPC ... *H04M 3/42365* (2013.01); *H04M 1/72569* (2013.01); *H04M 3/02* (2013.01); *H04M 3/42374* (2013.01); *H04M 3/54* (2013.01); *H04M 3/58* (2013.01); *H04W 4/16* (2013.01); *H04W 68/00* (2013.01)

(58) Field of Classification Search
CPC ............. H04M 3/42365; H04M 3/58; H04M 3/42374; H04M 1/72569; H04W 4/16
USPC .......................................... 455/417; 370/338
See application file for complete search history.

(56) References Cited

U.S. PATENT DOCUMENTS

2010/0056226 A1* 3/2010 Bansal .............. H04M 1/72519
455/567
2015/0094031 A1* 4/2015 Liu ........................ H04M 3/02
455/412.2

* cited by examiner

*Primary Examiner* — Marcos Batista
(74) *Attorney, Agent, or Firm* — Tarolli, Sundheim, Covell & Tummino LLP

(57) ABSTRACT

A method can include accessing, from memory, sensor data in response to detecting an incoming communication to a given communication endpoint. The sensor data represents at least one of a condition of the given communication endpoint or a condition of an operating environment associated with the endpoint. The method can also include analyzing the sensor data to determine endpoint condition data corresponding to at least one of a willingness or availability of a user to answer the incoming communication at the given communications endpoint. The method can also include adapting a duration that the incoming communication is offered to the given communication endpoint based on the endpoint condition data.

20 Claims, 4 Drawing Sheets

ADAPTIVE COMMUNICATION HANDLING

CROSS REFERENCE TO RELATED APPLICATIONS

The present application is a Continuation of U.S. patent application Ser. No. 14/553,407, filed Nov. 25, 2014, entitled "ADAPTIVE COMMUNICATION HANDLING", which is incorporated by reference herein in its entirety.

TECHNICAL FIELD

This disclosure relates to adaptive communication handling.

BACKGROUND

Various forms of telecommunication systems enable progression of call forwarding to enable an incoming call to ring a fixed number of times at one communication endpoint before forwarding the call to another destination or voicemail. These systems are typically referred to as ring-no-answer or forward-no-answer systems. In some cases, the system can be configured to ring at more than one endpoint simultaneously. Since, the number of or timing of rings at each endpoint is fixed, the duration typically is chosen as a compromise between providing enough time to allow the phone to be answered but short enough for the caller to be offered a way to either leave a message or contact another individual before hanging up. While solutions do exist where the phone is automatically answered for an incoming call, such an approach denies the user control over whether to accept or deny the call.

SUMMARY

This disclosure relates to adaptive communication handling.

As one example, a method can include accessing, from memory, sensor data in response to detecting an incoming communication to a given communication endpoint. The sensor data represents at least one of a condition of the given communication endpoint or a condition of an operating environment associated with the endpoint. The method can also include analyzing the sensor data to determine endpoint condition data corresponding to at least one of a willingness or availability of a user to answer the incoming communication at the given communications endpoint. The method can also include adapting a duration that the incoming communication is offered to the given communication endpoint based on the endpoint condition data.

As another example, one or more non-transitory computer-readable medium can store instructions executable by one or more processors for performing a method. The method can include accessing pre-alert sensor data in response to an incoming communication. The pre-alert sensor data represents a state of a given communication endpoint before generating an alert for the incoming communication. The method can also include accessing intra-alert sensor data captured in response to the incoming communication to represent a state of the given communication endpoint while generating the alert therefor. The method can also include analyzing intra-alert sensor data relative to the pre-alert sensor data to determine a condition of the given communication endpoint associated with the incoming communication. The method can also include adapting a duration that the incoming communication is offered to the given communication endpoint based on the analyzing.

As yet another example, a system can include at least one sensor to provide sensor data representing at least one of a condition of a given communication endpoint to which an incoming communication is directed or a condition of an environment associated with the given communication endpoint while the incoming communication is being offered to the given communication endpoint. An analyzer can analyze the sensor data to determine endpoint condition data representing whether a user is trying to answer the incoming communication being offered to the given communication endpoint. Call control can adjust a duration that the incoming communication is offered to the given communication endpoint based on the endpoint condition data.

DETAILED DESCRIPTION

This disclosure relates to adaptive communication handling, such as based on sensor data acquired for a given communications endpoint to which an incoming communication is directed. For example, the sensor data associated with the endpoint can be analyzed to determine a condition of the given communication endpoint. In some examples, the endpoint condition can relate to an availability and/or willingness of a user to answer an incoming communication derived from the sensor data. In additional or alternative examples, the endpoint condition can relate to an inability and/or refusal to answer the incoming communication derived from the sensor data. The determined endpoint condition thus can be employed to adapt a duration (e.g., ring count or ring time) that the incoming communication is offered to a communication endpoint before being redirected to another endpoint.

In some examples, the duration that the incoming communication is offered to the given endpoint can be extended to provide additional time to allow the user to answer the incoming communication, such as in response to inferring the user's willingness and/or availability to answer the communication based on the determined condition of the endpoint. In other examples, the duration that the incoming communication is offered to the given endpoint can be truncated (e.g., shortened) to expedite redirecting the communication to the other endpoint, such as in response to inferring the user's unwillingness or inability to answer the incoming communication base on the determined condition of the endpoint. As disclosed herein, the analysis of sensor data can be implemented by the endpoint and/or an associated call control, which may reside in a server to which the endpoint is connected via a network. Additionally, the sensor data can be collected by one or more sensors internal to the endpoint device and/or external to the endpoint. The different types of sensors that may be available or utilized for implementing adaptive call handling can vary depending on the type and configuration of each respective endpoint to which the incoming communication can be offered.

Figure 1:
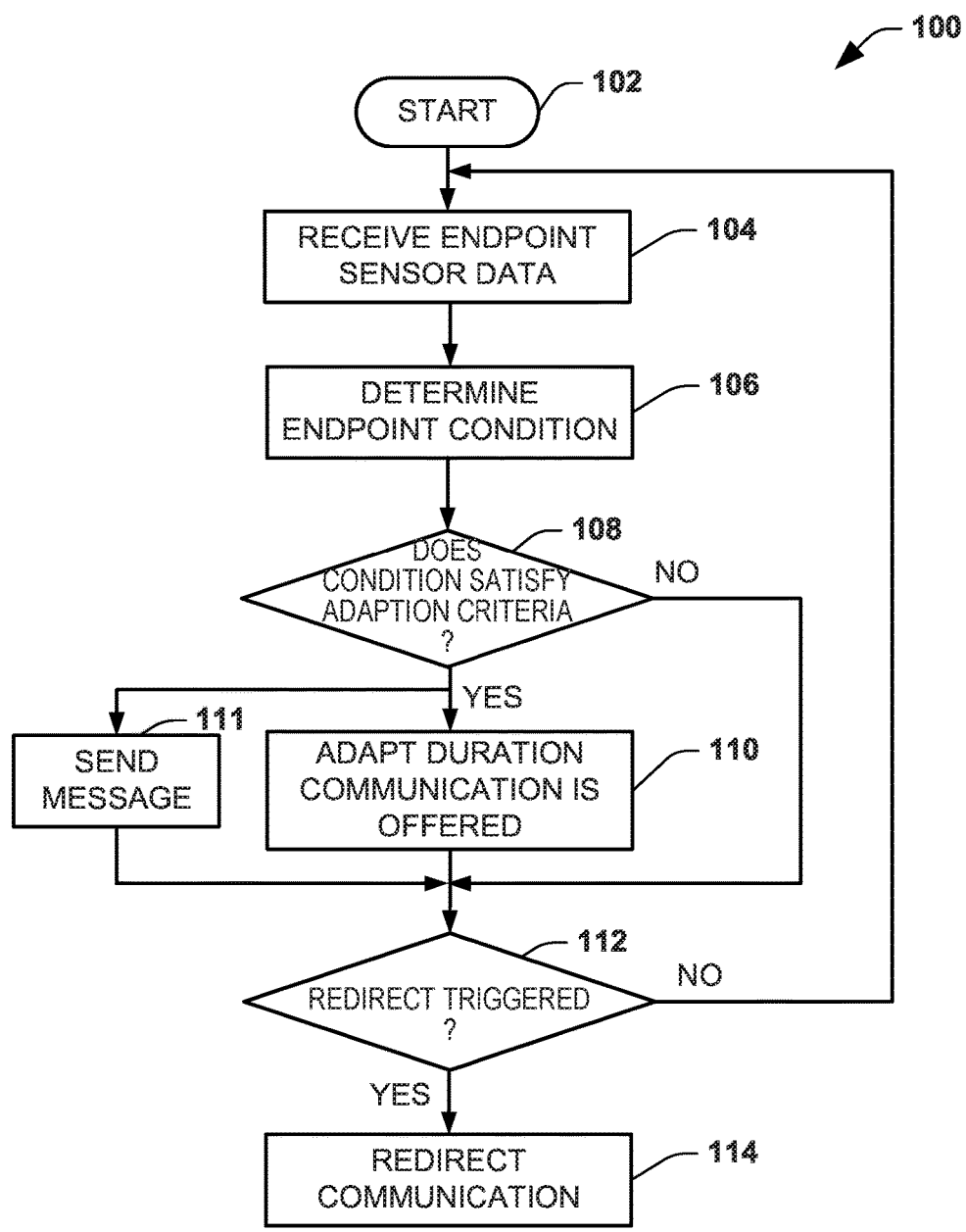
FIG. 1 is a flow diagram depicting a method to provide for adaptive communication handling.

FIG. 1 is a flow diagram depicting an example of an adaptive communication handling method 100. While, for purposes of simplicity of explanation, the method of FIG. 1 is shown and described as executing serially, it is to be understood and appreciated that such method is not limited by the illustrated order, as some aspects could, in other examples, occur in different orders and/or concurrently with other aspects from that disclosed herein. Moreover, not all illustrated features may be required to implement a method. The methods or portions thereof can be implemented as instructions stored in a non-transitory machine readable medium as well as be executed by one or more processing resources (e.g., processor cores) of one or more computers, for example.

The method begins at 102 such as involving operation of a given communication endpoint that is adapted to receive an incoming communication. The given communication endpoint can be a mobile device (e.g., smart phone, tablet, personal computer, laptop computer or the like), a desktop telephone, a soft phone running on a computer (i.e., a special purpose computer), a video conferencing terminal, or another device that is capable of bi-directional communication of audio, video, data or a combination thereof in response to connecting with the incoming communication. In other examples disclosed herein, an endpoint can also be a voicemail box implemented in a voicemail service. The particular endpoints to which the communication can be routed can depend on an escalation chain that has been established for a user and/or endpoint number to which the incoming communication is called. While for simplicity of explanation, the incoming communication is often described in the context of a call (e.g., a telephone call), it is understood that the communication is not limited to any one type of media, but instead can involve virtually any one or more type of media (e.g., audio, video, still images or graphics, text or the like).

As an example, call control operating in a communications network can offer the incoming call to the given endpoint by signaling to the given endpoint according to an established signaling protocol. Various types of signaling protocols can be utilized to offer the incoming call to the given endpoint, which can vary depending upon the type of endpoint and the network (or networks) via which call control offers the incoming communication. For example, a signaling protocol, such as the session initiation protocol (SIP) or cellular communications protocol, can be utilized to signal to the given endpoint in incoming call over a data communications or an internet protocol (IP) voice communications network. A ring back response can be provided to calling party (e.g., from the call control or given endpoint) while the communication is being offered to the given endpoint.

At 104, endpoint sensor data is received. The endpoint sensor data can be provided from one or more sensors (see, e.g., sensor 170, 172, 270 or 272). The sensors can be part of the endpoint itself (e.g., internal sensors integrated in the endpoint) and/or the sensors can be external to the endpoint. For example, an external sensor can communicate sensed information to the endpoint via a local communications link (e.g., a physical or wireless link) between the endpoint and the sensor. The types of sensors that can be utilized to provide the endpoint data can vary depending upon the type of endpoint device.

By way of example, where the given endpoint is a mobile wireless telecommunications device (e.g., cellular telephone or smart phone), internal types of sensors, which can be integrated in the mobile device, can include one or more of the following: a global position sensor (GPS), velocity sensor, one or more motion and/or one or more inertial sensors (e.g., an accelerometer, a gyrometer, a magnetometer and/or a tilt sensor), a light sensor (e.g., a photo detector), a proximity sensor, a microphone, near field sensors and the like. Examples of external sensors (e.g., sensing devices) that can be utilized to provide the sensor data can include one or more of the following: an activity sensor, heart rate sensor, or other health sensor. Each external sensor can be connected to provide the sensed information to the given endpoint via a communications link, which can be wireless (e.g., Bluetooth, wireless local area network, or the like) or include a physical link. The external sensors can be stand alone sensors or be integrated in a multi function device (e.g., smart watch or other device), each of which may be paired to the endpoint device via a wired or wireless communication link.

For the example of a docking station or a soft phone communication endpoint, the device on which the soft phone is executing (e.g., a computer) can include peripherals or user input components operative to detect user interaction in response to a user input device (e.g., a interaction via a mouse, touch screen, camera, microphone or keyboard). Thus, the user interaction that provides the sensor data can be in response to user interaction with the device itself. In other examples, the sensor data can be generated by a device that is known to be near by the docking station or soft phone, such as a computer or device that can be connected to a computer via communications link. The sensor data can be generated by another device to indicate user activity has been detected nearby the soft phone or docking station, which can be correlated in time with the incoming communication to the endpoint. Data from any one or more such sensors, which can vary depending upon the type of communication endpoint, thus can be received at 104 and stored in corresponding memory. The sensor data can be raw data from the sensors or it can be processed data.

As used herein, the sensor data would not include detecting that the user has answered the call in response to a user input. Instead, if the incoming communication is answered at the given endpoint while it is being offered (before the original or adapted ring count or ring time expires), the answering of the call can interrupt and terminate the method 100.

At 106, an endpoint condition can be determined (e.g., by analyzer 184, 284, 300) based on analysis of the sensor data (received at 104). The endpoint condition determined at 106 can correspond to a condition indicating a user's willingness or availability to answer the communication. Alternatively, the determined endpoint condition can indicate the user's inability or refusal to answer the call. For example, the endpoint condition can correspond to a change in position/orientation of the endpoint during the incoming communication. Additionally or alternatively, the endpoint condition can represent a change in environment for the endpoint that is detected during the incoming communication.

At 108 a determination is made as to whether the determined endpoint condition satisfies predetermined adaption criteria. The determination at 108 can include a comparison between the determined endpoint condition (derived from the sensor data) and one or more stored profiles. As an example, the stored profile can include threshold criteria that describes a set of one or more sensed parameters and/or changes in sensed parameters known to be consistent with a user answering or trying to answer an incoming communication for a given type and configuration of endpoint. There can be one or more profile for each user behavior that is to be discriminated at each endpoint. The behavior profile can be programmed by a user or an administrator, for example, for use at one or more user endpoints. Additionally or alternatively, the profiles for a given endpoint can be learned over time such as based on analysis of historical sensor data acquired when an incoming call is answered or not answered, for example.

For example, a comparison between the stored profile and the determined endpoint condition can provide an indication that the user is likely trying to answer the incoming communication at the given endpoint, such as by the endpoint condition substantially matching or exceeding a threshold level set by the stored profile. As an alternative example, the stored profile can include criteria that describe a set of one or more endpoint conditions known to be consistent with a user refusing to answer or being unable to answer the incoming communication. In this alternative example, the comparison between the stored profile and the determined endpoint condition can provide an indication of whether a user's behavior sufficiently indicates a refusal or inability to answer the incoming communication.

By way of further example, for a mobile device, assume that the mobile device begins within a pocket or other stored position (e.g., mounted on or in a protective holster). The stored profile can describe the endpoint condition based on sensor data representing an initial, pre-alert condition of the mobile device that reflects being in a pocket or other stored position. For instance, the initial pre-alert condition for the profile (e.g., representing being stored in pocket or in a purse) can represent sensor state information for the given communication endpoint before up to slightly after generating the alert, such as based on sensor data that includes data from a light sensor data, proximity sensor data, acceleration data, and gyrometer data. Another profile can be established based on the same or a subset of the same sensor data to indicate that the user is taking steps toward answering the incoming communication at the mobile device (e.g., mobile telephone). For instance, such the sensor data can be acquired while the user is physically removing the phone from the pocket or purse while the alert is being generated for the incoming communication. A plurality of different profiles can be created, each of which can specify different threshold conditions that can be applied to the endpoint condition that is determined from sensor data captured before and during offering of the incoming communication at the given endpoint. In some examples, the starting pre-alert condition of the endpoint device can be used to select a subset of available profiles that are each applied to determine whether criteria is met to trigger adjustment of the ring time or count.

In response to the adaption criteria being met at 108, indicating that the duration that adaption criteria has been met, the method can proceed from 108 to 110. At 110, the duration (e.g., ring count or ring time) that the incoming communication is offered to the given endpoint is adapted. As disclosed herein, in some examples, the ring time can be extended such as to defer redirecting (e.g., transfer) of the incoming call from the given endpoint to another endpoint. Such other endpoint, for example could include another endpoint device (e.g., telecommunications equipment) having a different telephone number or a voice mailbox associated with the given endpoint to which the incoming communication was offered.

In other examples, the adaption criteria can additionally or alternatively relate to a user's inability or refusal to answer the incoming call. Where the endpoint condition determined at 106 is consistent with such inability or refusal to answer, such criteria can be met thereby proceeding from 108 to 110. When the criteria relates to the refusal or inability to the user being able to answer the call, the adapting of the ring time at 110 can include truncating (e.g., shortening) prematurely the duration for offering the incoming communication to the given endpoint. Truncating the duration results in redirecting the incoming communication sooner than an established duration (e.g., set by an authorized user or administrator) or if the duration is extended.

Additionally, in response to determining to adapt the duration that the incoming communication is offered to the given endpoint, at 111, the method can include sending a message to the calling party, which can occur in parallel with the adaption of the duration. The message can be provided via the same or a different form of communication than the incoming communication. For example, the message can be sent as a text message or email, whereas the incoming communication is a telephone call. Additionally, the automated communication can be generated to specify a reason why the communication is being adapted, such as based on the determined endpoint condition. As an example, if the duration is being truncated to expedite redirecting the incoming communication, the message at 111 can indicate that the user is unable answer the communication generally or provide a particular reason. As another example, if the duration is being extended, the message can indicate that the user is in the process of answering the communication.

At 112, a determination is made as to redirect the communication. For example, the determination at 112 can be made by determining whether the duration (e.g., an adapted version or the original established duration) has expired. Thus, if the ring time has been extended or increased, the incoming communication (e.g., incoming call) will continue being offered at the given endpoint for a longer period of time for the initial established duration (e.g., a fixed value for the ring time). In other examples, where the ring time has been adapted to truncate the duration for offering the incoming communication at the given endpoint, the ring time can be reduce to something that is less than the established duration, such as to cause immediate expiration of the timer. If the duration has not expired or the incoming communication is not otherwise redirected, the process can continue to loop back to 104 to repeat the foregoing process until it is determined to trigger a redirect. In response to determining to redirect the incoming communication (e.g., if the ring time has expired or a redirect for the communication is triggered by other means), the method can proceed from 112 to 114.

At 114 the method can redirect the call from the given endpoint to another endpoint. As disclosed herein, the other endpoint can be another communications device, such as can be associated with the same user to which the given endpoint is associated. In other examples, the other endpoint can be associated with a different user, such as can be specified in an escalation plan, which can be stored in memory used by a communication controller. For instance, the other endpoint can include a phone number for an assistant or receptionist or other specified user. As yet another example, the other endpoint can be a voicemail box for the given endpoint.

Figure 2:
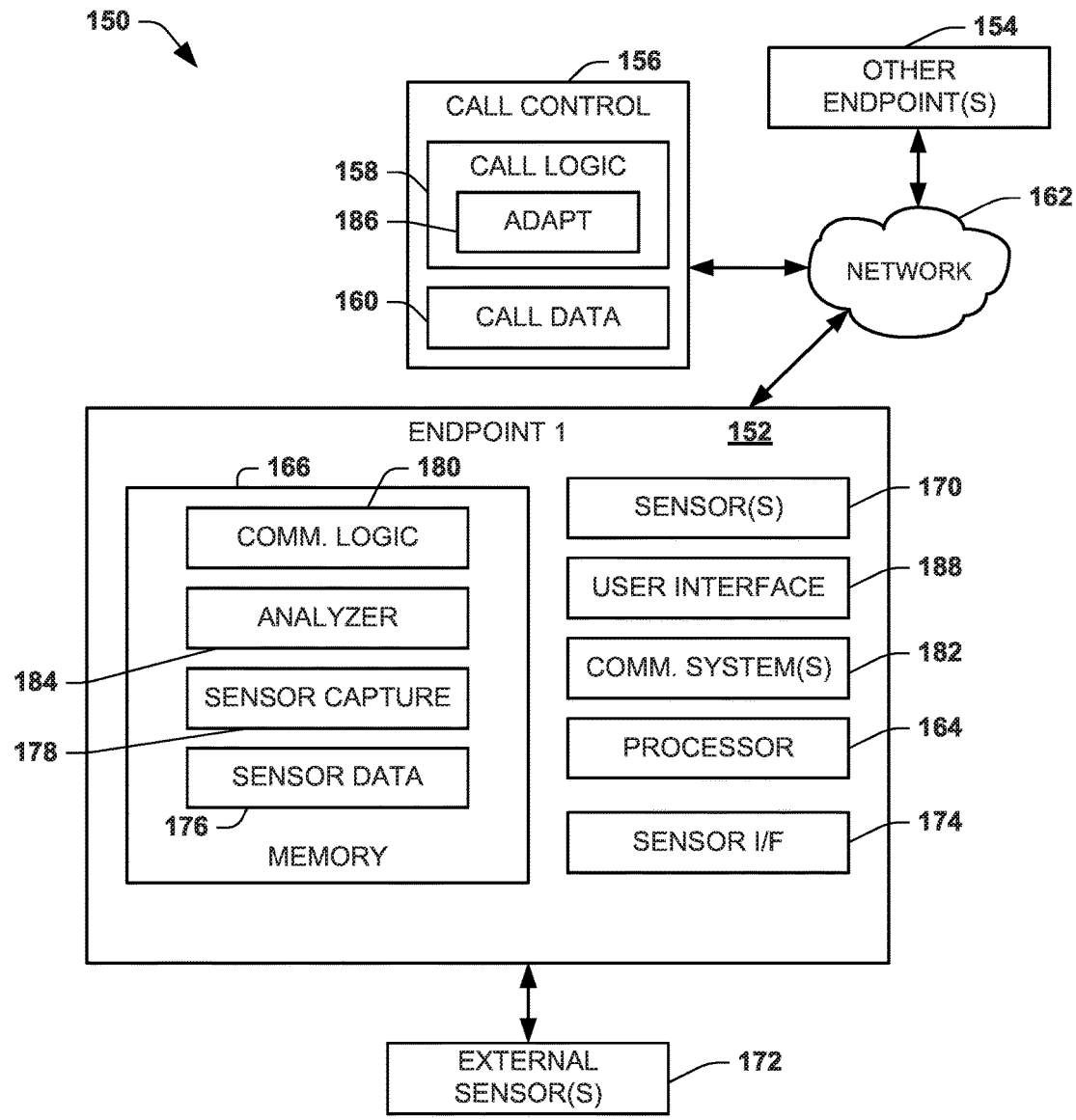
FIG. 2 depicts an example of a communication system implementing adaptive communication handling.

FIG. 2 depicts an example of a system 150 that can implement adaptive call handling. The system 150 includes a plurality of endpoint resources (also referred to as endpoints) 152 and 154, indicated at endpoint 1 and one or more other endpoints. While two such endpoint resources are illustrated in the example of FIG. 2, any number of two or more endpoint resources can be implemented in the system 150. The endpoint resources 152 and 154 can provide for interactive forms of communications, such as audio communications (telephone calls, voicemail), audio and video communications (e.g., video conferencing, video voicemail) and/or data communications (e.g., short message service, instant message, data collaboration). Thus, the endpoint resources 152 and 154 can be implemented as a variety of different types of hardware and/or software, such as IP phones, desk phones, soft phones, video phones, smart phones, cellular telephones, voice conferencing devices, computers, internet appliances, services running in a cloud as well as combinations and parts thereof.

The system 150 also includes a call control 156 that is configured to perform call handling for incoming and outgoing communications according to rules that specify at least two endpoints (e.g., endpoints 152 and 154) and a logical order for directing incoming calls for each endpoint. In some examples, the call control 156 can be implemented as part of a private branch exchange (PBX) (e.g., an IP PBX) for controlling call handling in a private enterprise communications network, corresponding to an enterprise that is administered and/or operated by or on behalf of a private entity (e.g., a company, group of users, or other service provider). In other examples, the call control 156 can operate within a service provider's public network (e.g., Verizon, AT&T or T-Mobile or other common carrier), which can provide cellular wireless communications and/or public switched telephone services over physical connections. As yet another example, the call control 156 can reside in each endpoint (e.g., endpoints 152 and 154) itself, such as in peer-to-peer VoIP systems. Still further, the functionality of the call control 156 could be distributed between endpoints 152 and 154 and other components (e.g., hardware and/or software) operating in the system 150.

For the example, where the system 150 operates as a private communications network, the call control 156 can send and receive communications to and from endpoint resources 152 and 154, which resources are registered in the private network, as well as control routing, distributing and managing communications within the private network. Whether a private or public network, the communications system 150 can be configured to implement packet switched calls, such as implementing voice over internet protocol (VoIP), circuit switched calls or a combination of packet and circuit switched communications via the network 162.

The call control 156 includes call logic 158 to implement the call routing functions for incoming and outgoing calls to and from the endpoints 152 and 154. For instance, the call logic is programmed to perform call routing according to an escalation chain. The escalation chain can include rules that define circumstances to redirect the incoming communication from a given endpoint 152 to another endpoint 154 if a call is not answered within a predetermined duration (e.g., defined by an established ring time or ring count). The predetermined duration can be programmed as part of call data (e.g., ring time value) 160 that is utilized by the call logic 158 for implementing the call routing and handling functions in the escalation chain for a given user or telephone number. The predetermined duration thus can have a value implemented in call data 160 can be set in response to a user input, such as by an administrator of the system 150 or another authorized user. In some examples, the call logic 158 can be configured to offer an incoming call to more than one endpoint concurrently as part of a group of endpoints (e.g., a hunt group) assigned to receive incoming calls directed to a telephone number (e.g. a public number, a private extension) to which the incoming call was placed.

The call control 156 is in communication with each of the endpoints 152 and 154 via a network 162. The network 162 can include a combination of one or more networks capable of transferring communication signals. For example, the network 162 can include a local area network (LAN) and/or a wide area network (WAN) (e.g., the Internet, cellular telephone network(s). The network 162 thus can include a public switched telephone network (PSTN) and/or one or more other networks.

By way of example, the endpoint 152 can be implemented as a mobile device (e.g., a cellular telephone or smart phone) that includes a processor 164 and memory 166, which stores data and machine readable instructions executable by the processor. In some examples, the endpoint 152 can be a multifunction device that can operate according to a plurality of communication modes, such as including operating as a wireless IP phone over a data communication network as well as a cellular telephone that communicates wirelessly using a cellular voice and/or data communications.

In the example of FIG. 2, the call control 156 employs the call logic 158 to route incoming calls to the endpoint 152 via one or more communication networks (corresponding to the network 162) in which the endpoint 152 is configured to communicate. For example, the call control 156 can be implemented by a cellular telephone service provider for implementing adaptive handling with respect to subscribers in its telephone network including its endpoint 152. In other examples, the call control 156 can be implemented as part of a private network in an international protocol (IP) private branch exchange (PBX) such as can be in a business or other enterprise.

The endpoint 152 can include one or more sensors 170 configured to sense conditions associated with the endpoint 152 for the example of a smart phone or other mobile device, the sensors 170 can include acceleration sensors, gyrometer, proximity sensor, light sensor (e.g., one or more photodetectors), audio sensors (e.g., microphone), GPS sensors as well as other data that can be derived from the operation of the endpoint 152 in the communication system 150. One or more external sensors 172 can also be connected to the endpoint 152. The external sensors can be connected to the endpoint 152 via a sensor interface 174. For example, the sensor interface 174 can include a wireless interface, such as Bluetooth or other short-range communication standard. In other examples, the external sensors 172 can be physically connected (e.g., via an electrical connector) to the sensor interface 174 for communicating sensor data. Data from each of the sensors 170 and/or 172 can be stored in the memory 166 as sensor data 176. While the external sensor(s) 172 is demonstrated as providing sensor data to the endpoint 152, in some examples, the external sensor(s) 172 can provide sensor data directly to the call control via the network 162 via a communications link (e.g., a physical or wireless connection—not shown). Other information associated with operation of the endpoint 152 or derived from operating parameters can also be stored as sensor data 176 in the memory 166. For example, the sensor data 176 can include or be derived from information collected from a part of a component resource, such as keystroke data from a keypad or touch screen, audio data from a microphone, image data from a camera, as well as signal strength or location codes from a cellular service provider.

The memory 166 can also include a sensor capture module 178 that can be programmed to aggregate the data from the sensors 170 and 172 to provide the corresponding sensor data that is relevant to the adaptive communication handling. For example, the sensor capture module can collect a set of the sensor data from a selected set of the sensors 170, 172 at prescribed sampling times, which can be relative to detecting an incoming communication at the endpoint 152. The sensor capture module 178 can also normalize the data or otherwise pre-process the data to facilitate the adaptive call handling functionality disclosed herein.

As an example, in response to detecting an incoming call being received at the endpoint 152, the sensor capture module 178 can be programmed to store the sensor data 176 from a set of one or more sensors 170 and 172. For instance, the memory 166 can include communication logic 180 that detects the incoming communication via a corresponding communication system 182 and triggers the sensor capture module 178 to collect information from the set of sensors and/or selected endpoint operating data. As disclosed herein, the set of sensors and selected operating data can be selected to provide information with a behavior (e.g., user and/or endpoint behavior) consistent with trying to answer the incoming communication or, in other examples, behavior consistent with an express refusal or unwillingness to answer the incoming communication.

As a further example, the call logic 158 of the call control 156 can signal the communication system 182 via the network 162 for offering the incoming call to the endpoint 152. In response to the initial offering from the call logic, the sensor capture module 178 can be activated to capture one or more time instances of the sensor data 176 prior to announcing the incoming call, such as by ringing the call at the endpoint 152. As used herein, "ringing" can refer to any means implemented at the endpoint 152 for alerting a user of the incoming call, such as an audible signal (e.g., tone, music, etc) via a loudspeaker at the endpoint, a visual indicator (e.g., flashing a light, activating a screen, etc.) or a tactile indicator (e.g., vibrating the device) or the like. The sensor data 176 stored to reflect a condition of the endpoint prior to generating an alert for the incoming call, which can be referred to as pre-alert sensor data, provides a point of reference to a condition of the endpoint and/or user behavior prior to being alerted by the ringing of the incoming call. The pre-alert sensor data can be triggered in response to detecting the incoming call and/or the alert being generated, for example. The sensor capture module 178 can also store sensor data 176 during the ringing of the incoming call, which can be referred to as intra-alert sensor data. The sensor capture module 178 can trigger the capture of the intra-incoming call sensor data at one or more instances while the incoming call is being offered and presented to the user via the endpoint before the call is answered. The intra-incoming call sensor data provides an indication of one or more conditions of the endpoint 152 and/or user behavior responsive to the ringing of the incoming call.

An analyzer 184 analyzes the sensor data 176 to determine a condition of the endpoint and/or user behavior in response to the incoming call. The endpoint condition, for example, can provide an indication of a user's ability or willingness to answer the call based on the sensor data. For example, the analyzer determines that sensor data indicates the endpoint has been removed from a storage position (e.g., detected by proximity sensor and/or light sensor) and is then moved (e.g., as detected by motion and/or inertial sensors) during the ringing of the call. Other sensor data can be utilized to determine that a user is trying to answer the call such that the duration that the call is being offered at the endpoint 152 should be extended.

Alternatively or additionally, the analyzer 184 can evaluate the sensor data 176 collected during the ringing of the call to determine that the endpoint condition provides an indication of a user's inability or refusal to answer the incoming call. For example, the analyzer 184 determines that sensor data indicates the endpoint device has been replaced back into the storage position after previously being detected as removed (e.g., detected by proximity sensor and/or light sensor). Additionally or alternatively, the analyzer 184 can determine that a user has interacted with the endpoint 152 via a user interface (e.g., button, keypad, touch screen, etc.) in a way other than to answer the call. Thus, the analyzer 184 can infer from such user interaction captured in the sensor data that the user does not wish to answer the incoming call, such that the duration that the call is being offered at the endpoint 152 should be truncated and redirected to another endpoint 154.

In some examples, the analyzer can evaluate the sensor data 176, which can include pre-incoming call data and/or intra-incoming call data, to automatically determine to truncate the ringing of incoming call at the endpoint 152. As an example, it may be known that use of a given mobile endpoint may be geographically restricted or even prohibited under certain conditions. For instance, it may be illegal or otherwise undesirable to use a mobile telephone or communicate using text messaging in certain locations (e.g., schools, hospitals, corporate meeting rooms) or while driving through restricted zones (e.g., school zones or certain municipalities). The policies associated with such prohibitions can be stored as rules implemented by the analyzer 184 and can be user programmable or set to default policies by the call control, for example. Thus, the analyzer can determine that the endpoint 152 is moving at a particular speed (e.g., indicative of driving) through a restricted zone (e.g., based on GPS data and/or cellular operating data indicating location). When the endpoint condition indicates that answering the incoming communication is currently restricted, the analyzer can determine the incoming communication should be truncated and redirected to the other endpoint 154.

In some examples, when the endpoint condition indicates that answering the incoming communication is currently restricted, the analyzer can trigger an automated communication (e.g., a message) that is sent to the calling party. The automated communication can be provided via the same or a different form of communication than the incoming communication. Additionally, the automated communication can be generated to specify a reason why the communication was not answered directly by the user.

The resulting endpoint condition determined by the analyzer 184 can correspond to the analysis data that can be sent (e.g., as an adapt signal request) to the call control 156 via a communication link. The communication link can include a path from the communication system 182 via the network 162 to the call control 156. In response to the adapt signal request, the call logic 158 can include an adapt function 186 to adjust the duration (e.g., ring count or ring time) that the incoming call is offered to the endpoint 152. The adapt function 186 can adapt to extend or truncate the duration based on adaption instructions specified in the adapt signal request, for example.

In some examples, the adapt function 186 can extend the duration in response to the adapt signal request specifying an increased ring time, such as in response to detecting an endpoint condition that indicates the user is trying to answer the incoming call. In other examples, the adapt function 186 can truncate the duration in response to the adapt signal request specifying a reduction in the ring time, such as where the detected endpoint condition indicates the user is trying to refuse the incoming call or if the call may be geographically restricted at the endpoint.

As a further example, the endpoint 152 can include a user interface 188 that a user can employ to interact with the endpoint. Such user interaction can include answering the call by pressing a talk or ON button, picking up a receiver from an ON-hook to an OFF-hook position or the like, which can vary depending on the type of endpoint. In response to the user interface 188 indicating that the user has answered the call, the communication system 182 can provide a call-answered response back to the call control 156, and the incoming call can be connected with the endpoint 152. If the ring time, whether adapted or the original (pre-adapted) ring time that is programmed via the call logic 158, expires before the call has been answered via the user interface 188, the call logic 158 at the call control 156 can redirect or transfer the incoming call to another endpoint 154 via the endpoint. As disclosed herein, the next endpoint 154 can be another communications device (or another telephone number) that is specified in an escalation chain or the endpoint 154 can correspond to a voice mailbox associated with the endpoint 152. If the endpoint is another device, it can be configured to facilitate adaptive call handing similar to as disclosed with respect to the endpoint. The sensor data utilized at the other endpoint 154 to implement the adaptive call handling can be the same or different from the sensor data employed at the endpoint 152.

Additionally, more than one adapt signal request can be provided to the call logic 158 during a given incoming call at the endpoint 152, and the call logic thus can adapt the duration more than once during a given call. For instance, the adapt function can extend the ring time for an incoming call in response to a first adapt signal request, and then truncate the ring time in response to a second request that is received while the call is still be offered to the endpoint. This can correspond to a situation where a user is alerted to the call and removes the mobile endpoint from a stored position (e.g., in a pocket), which results in adapting to extend the ring time. Upon viewing caller identification, the user decides to not answer the call or otherwise declines the call, which results in adapting to truncate the remaining ring time that had previously been extended. However, this affords the user the opportunity to answer the call or not answer the call.

Figure 3:
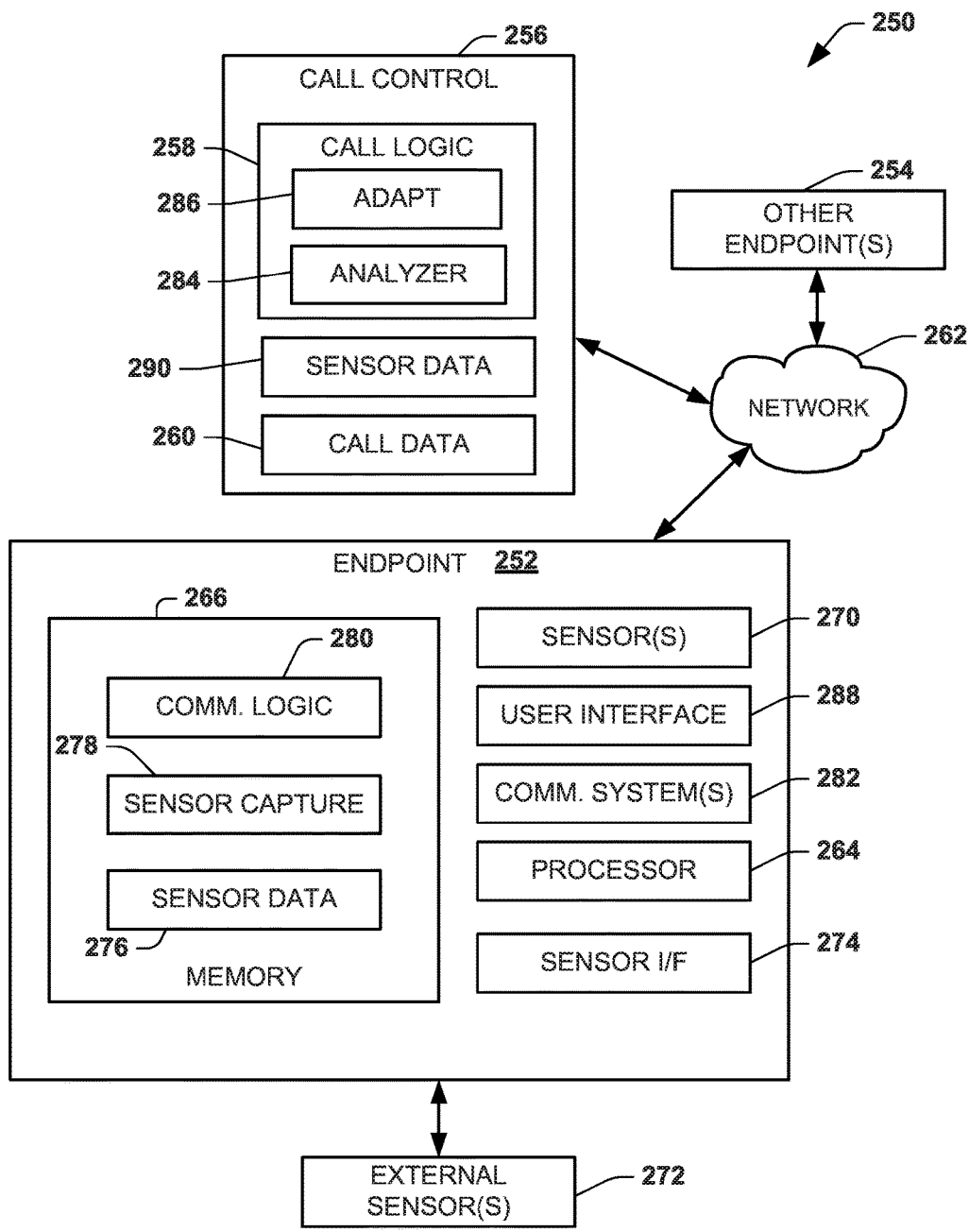
FIG. 3 depicts an example of another communication system implementing adaptive communication handling.

FIG. 3 depicts an example of a system 250 implementing adaptive call handling. The system 200 is similar to the system 150 disclosed with respect to FIG. 2, and includes similar components that are identified in FIG. 3 using the same reference numbers, increased by adding 100, to indicate corresponding functionality. Accordingly, reference can be made back to FIG. 2 for additional information about the common components and their respective features. In the example system 200 of FIG. 3, some of the functionality has been distributed to call control 256. Specifically, the analyzer has been implemented at the call control (instead of at the endpoint itself as in the example of FIG. 2).

Briefly stated, sensor capture module 278 causes sensor data to be collected similarly to the example of FIG. 2. However, selected sensor data is provided to the call control and stored in memory as endpoint sensor data 290. The sensor data 290 that is provided to the call control 256 can be the same or different from the sensor data 176 (FIG. 2). Analyzer 284 is implemented as part of the call logic 258 to determine a condition of the endpoint based on evaluation of the sensor data 290, such as disclosed with respect to FIG. 2. The adapt function 286 can process the endpoint condition data for one or more set of the sensor data to adjust the duration (e.g., ring time or count) that the incoming communication is presented to the endpoint 252, such as to extend the duration or truncate the duration according to the endpoint condition data. Once the duration expires, whether adapted duration or not, the call logic 258 can redirect the incoming communication to another endpoint 254, such as disclosed herein.

While the examples of FIGS. 2 and 3 demonstrate the analyzer implemented in either the endpoint or the call control, the functionality of the analyzer could be distributed so that a portion of the analyzer functionality is implemented at the endpoint and another portion of the analyzer functionality is implemented at the call control. In this alternative example, the analyzer thus can be distributed among at different nodes in the communications system.

Figure 4:
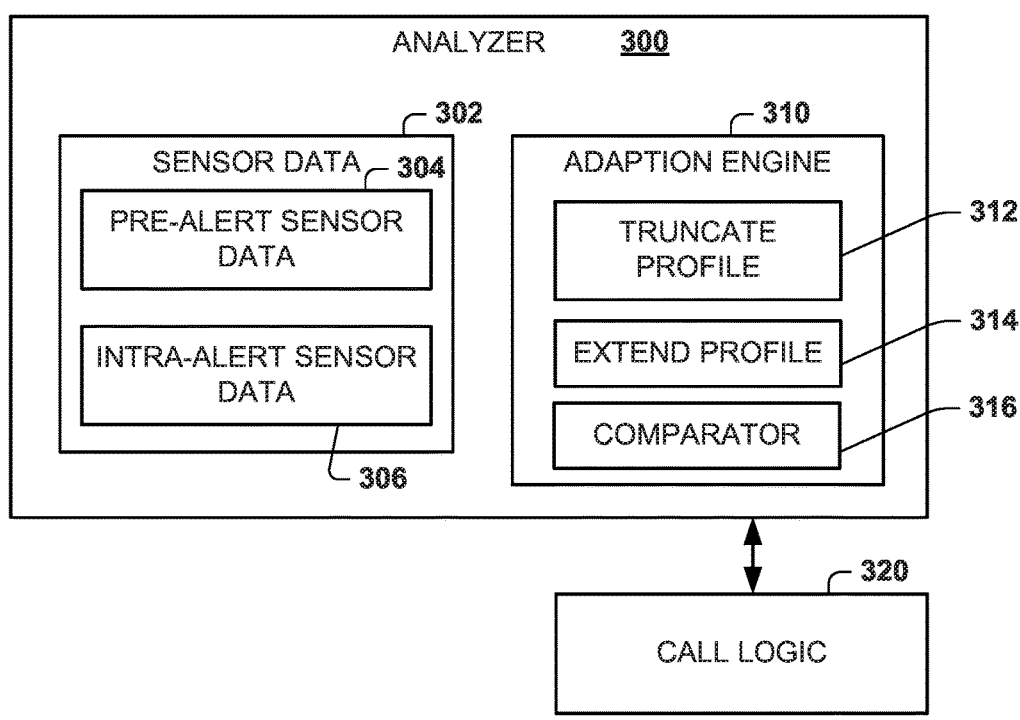
FIG. 4 depicts an example of an analyzer and routing control that can implement at least a portion of adaptive communication handling.

FIG. 4 depicts an example of an analyzer 300 that can implement adaptive call handling. The analyzer, for example, can correspond to the analyzer 184 or 284 disclosed with respect to FIG. 2 or 3, respectively. The analyzer 300 includes sensor data 302 that can be received from a sensor capture module 178 of FIG. 2 or 278 of FIG. 3. As mentioned, the analyzer 300 can be implemented in an endpoint or in call control or be distributed between both an endpoint and call control.

In the example of FIG. 4, the sensor data 302 includes pre-incoming call sensor data 304 as well as intra-incoming call sensor data 306. The pre-alert sensor data 304 can include a snap-shot of sensor data at an instance prior to generating an alert to announce an incoming communication (e.g., telephone call) to a user at the endpoint (e.g., via an alert generator for an audible, visual and/or tactile alert). The access to the pre-alert sensor data 304, which is acquired and stored in memory prior to the incoming communication, thus can be triggered in response to receiving signaling identifying the incoming communication. The intra-alert sensor data 306 can include one or more data sets for the same sensors as provided in the pre-alert sensor data 304 while the alert is being generated for the incoming call at the endpoint (e.g., during call-ringing). Thus, the intra-alert sensor data 306 can include a set of sensor data sampled at one or more intervals while the incoming call is being offered at the endpoint, but prior to being answered in response to a user input. Thus, differences between the intra-alert sensor data 306 and the pre-alert call sensor data 304 thereby reflect changes in operation of the endpoint and/or user behavior presumably in response to the incoming communication. Similar differences can exist between the sequence of intra-incoming call data acquired over time while the incoming call is being offered at the endpoint before ultimately connected, redirected to another endpoint or is terminated by the calling party. Thus, the intra-alert sensor data can be stored to provide state information for the given communication endpoint while alerting the user of the incoming call.

The analyzer 300 can include an adaption engine 310 that is programmed to evaluate the sensor data 302 to determine an endpoint condition, which may indicate adaption of the duration that the incoming communication is offered to the endpoint. For example, the adaption engine 310 can include a comparator 316 to compare the intra-incoming call data 306 with the pre-incoming call sensor data 304 to ascertain changes in the sensor data and thereby indicate a corresponding change in one or more conditions for the endpoint. Additionally or alternatively, the comparator 316 can compare intra-incoming call data 306 obtained at two or more different time instances to ascertain changes at the endpoint.

The results of the comparison between the data 304 and 306 and/or between subsequent intra-call data 306 can be stored in memory and be evaluated to ascertain the endpoint condition.

In some examples, the adaption engine 310 can include one or more adaption profiles, demonstrated as a truncate profile 312 and an extend profile 314. The extend profile 314 can be applied to ascertain whether the sensor data is consistent with an endpoint condition where a user is available and/or willing to answer the incoming communications. Similarly, the truncate profile 312 can be applied to ascertain whether the sensor data is consistent with an endpoint condition where a user had interacted with the endpoint in a manner to indicate a refusal to answer the incoming communication or if the endpoint condition meets a geospatial restriction for answering an incoming communication.

For example, one or more of the profiles 312 and 314 can be applied to both the pre-alert sensor data 304 and the intra-alert sensor data 306. In other examples, one or both profiles can be applied to results of a comparison (by comparator 316) between the pre-incoming call sensor data 304 and the intra-alert sensor data 306. The extend profile can evaluate each of the data individually or collectively based upon a comparison between the two respective data sets 304 and 306. The truncate profile 312 can include a plurality of profiles to ascertain the condition of the endpoint before and during the incoming call. For example, one or more truncate profiles can be provided for detecting a user's refusal to answer the incoming communication and one or more profiles can be provided for detecting different geospatial restrictions.

Each of the profiles 312 and 314 can be pre-programmed with values for a set of sensors determined to correlate with a known endpoint condition. The values can include default values for a global set of users according to sensors associated with each of the different endpoints. In other examples, the values for a given profile can be user and endpoint specific, such as can be learned by monitoring sensor values when one or more incoming communications are answered by the user at the respective endpoint as well as for instances when one or more other communications are explicitly refused by the user. The refusal can be indicated in response to a user input activating a button or touch screen interface to deny the communication. In other examples, the explicit refusal can be inferred from sensor data indicating user behavior consistent with viewing the device and then returning the device to a stored position (e.g., in a pocket, purse or device holder).

As a further example, the adaption engine 310 can employ the comparator 316 to compare the extend profile 314 with respect to the sensor data 302 and in turn generate an adapt request to call logic 320 to extend the incoming communication based on determining that the sensor data 302 sufficiently matches the extend profile 314 (e.g., within a pre-defined statistical threshold). The comparator 316 can also compare the sensor data 302, including the pre-alert and the intra-alert sensor data 304 and 306, with respect to the truncate profile 312. In response to the comparator 316 determining that the sensor data is consistent with a pre-programmed truncate profile, indicating a user's inability or refusal to answer the incoming call, the comparator can provide an adapt request signal to the call logic 320 to truncate the duration that the incoming communication is offered at the given endpoint.

The call logic 320 can include rules associated with the routing and handling of the incoming communication to the endpoint. The call logic 320 can also implement the extension or truncation of the ring time in response to an adapt request signal from the adaption engine 310. The call logic 320 can also include an escalation chain for each of a plurality of endpoints that specifies a list of endpoints and an order to which the incoming call is to be redirected. In some examples, the call logic 320 further can specify one or more simultaneous endpoints to which a given incoming call can be routed simultaneously at any stage of the escalation chain. In a simplified example, the escalation chain could include a given endpoint as the primary and voicemail box as the next endpoint. In other examples, more detailed escalation chains and conditional logic can be implemented.

The adaptive call handing disclosed herein (e.g., with respect to FIGS. 1-4) can leverage existing or specially designed sensors to detect a behavior consistent with a user trying to answer an incoming communication provide information (e.g., an adapt request signal) back to a call controller to provide the user more time to answer the communication before transferring it to another endpoint (e.g., another telephone or voicemail). Since the user is given more time, the user can make an informed decision on whether or not to answer the call.

In view of the foregoing structural and functional description, those skilled in the art will appreciate that portions of the systems and method disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in a non-transitory machine readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, optical storage devices, and magnetic storage devices.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A method comprising:
accessing, from memory, sensor data in response to detecting an incoming communication to a given communication endpoint, the sensor data representing at least one of a condition of the given communication endpoint or a condition of an operating environment associated with the given communication endpoint;
analyzing, with an analyzer, the sensor data to determine endpoint condition data corresponding to at least one of a willingness or availability of a user to answer the incoming communication at the given communication endpoint; and
adapting a duration that the incoming communication is offered to the given communication endpoint based on the endpoint condition data.

2. The method of claim 1, further comprising receiving the sensor data from at least one sensor that is integral within the given communication endpoint.

3. The method of claim 1, further comprising receiving the sensor data from at least one sensor via a communications link, the at least one sensor being external to the given communication endpoint.

4. The method of claim 1, further comprising:
connecting the given communication endpoint with the incoming communication if the incoming communication is answered in response to a user input before the duration expires; and
redirecting the incoming communication to another endpoint in response to the duration expiring before the incoming communication is answered at the given communication endpoint.

5. The method of claim 4, wherein adapting the duration comprises extending the duration.

6. The method of claim 4, wherein adapting the duration comprises truncating the duration.

7. The method of claim 4, further comprising redirecting the incoming communication from the other endpoint back to the given communication endpoint in response to determining the endpoint condition indicates a behavior consistent with answering the incoming communication at the given communication endpoint before the incoming communication is answered and connected at the other endpoint.

8. The method of claim 1, further comprising storing pre-alert sensor data in the memory prior to receiving the incoming communication to provide state information for the given communication endpoint before generating an alert at the given communication endpoint for the incoming communication.

9. The method of claim 8, further comprising storing intra-alert sensor data in the memory in response to the incoming communication to provide state information for the given communication endpoint while alerting the user of the incoming communication,
wherein the endpoint condition is determined based on a difference between the pre-alert sensor data and the intra-alert sensor data.

10. The method of claim 1, further comprising storing intra-alert sensor data in the memory to provide state information for the given communication endpoint while alerting the user of the incoming communication,
wherein the endpoint condition is determined based on based on differences between the intra-alert sensor data stored for at least two different time instances.

11. The method of claim 1, further comprising:
storing a profile that represents sensor data acquired during behavior associated with answering a plurality of incoming communications at the given communication endpoint; and
applying a stored profile to the sensor data stored in response to the incoming communication to determine the endpoint condition data.

12. The method of claim 1, wherein the incoming communication comprises a telephone call and the duration that the incoming communication is offered to the given communication endpoint is a predetermined ring count or ring time.

13. A communications system comprising:
at least one sensor to provide sensor data representing at least one of a condition of a given communication endpoint to which an incoming communication is directed or a condition of an environment associated with the given communication endpoint while the incoming communication is being offered to the given communication endpoint;
an analyzer to analyze the sensor data to determine endpoint condition data representing whether a user is trying to answer the incoming communication being offered to the given communication endpoint; and
call control to adjust a duration that the incoming communication is offered to the given communication endpoint based on the endpoint condition data.

14. The system of claim 13, wherein the given endpoint communication endpoint comprises a mobile communication device, and
wherein the at least one sensor includes an internal sensor integrated in the mobile communication device.

15. The system of claim 14, wherein the at least one sensor further comprises a sensor that is external to the mobile communication device and communicates the sensor data via a communications link.

16. The system of claim 13, wherein the call control connects the given communication endpoint with the incoming communication if the incoming communication is answered, in response to a user input, before the duration expires, and
wherein the call control redirects the incoming communication to another endpoint in response to the duration expiring before the incoming communication is answered at the given communication endpoint.

17. The system of claim 16, wherein the call control extends the duration in response to determining that the endpoint condition data indicates that the user is trying to answer the incoming communication being offered at the given communication endpoint, and
wherein the call control truncates the duration if the endpoint condition data indicates that the user has refused to answer the incoming communication.

18. The system of claim 16, wherein the call control redirects the incoming communication from the other endpoint back to the given communication endpoint in response to determining the endpoint condition indicates a willingness to answer the incoming communication at the given communication endpoint before the incoming communication is answered and connected at the other endpoint.

19. The system of claim 13, wherein the sensor data comprises:
   pre-alert sensor data captured in response to the incoming communication before generating an alert at the given communication endpoint for the incoming communication, the pre-alert sensor data representing sensor state information for the given communication endpoint before generating the alert; and
   intra-alert sensor data captured in response to the incoming communication while generating the alert therefor,
   wherein the analyzer determines the endpoint condition based on a comparison between the pre-alert sensor data and the intra-alert sensor data.

20. The system of claim 13, wherein the sensor data comprises:
   intra-alert sensor data captured in response to the incoming communication, the intra-alert sensor data representing sensor state information for the given communication endpoint for at least two time instances while generating the alert for the incoming communication,
   wherein the analyzer determines the endpoint condition based on changes in the intra-alert sensor data.

* * * * *